H. S. MILLS.
COIN OPERATED WEIGHING SCALE.
APPLICATION FILED JULY 21, 1913.
1,171,866.
Patented Feb. 15, 1916.
6 SHEETS—SHEET 1.
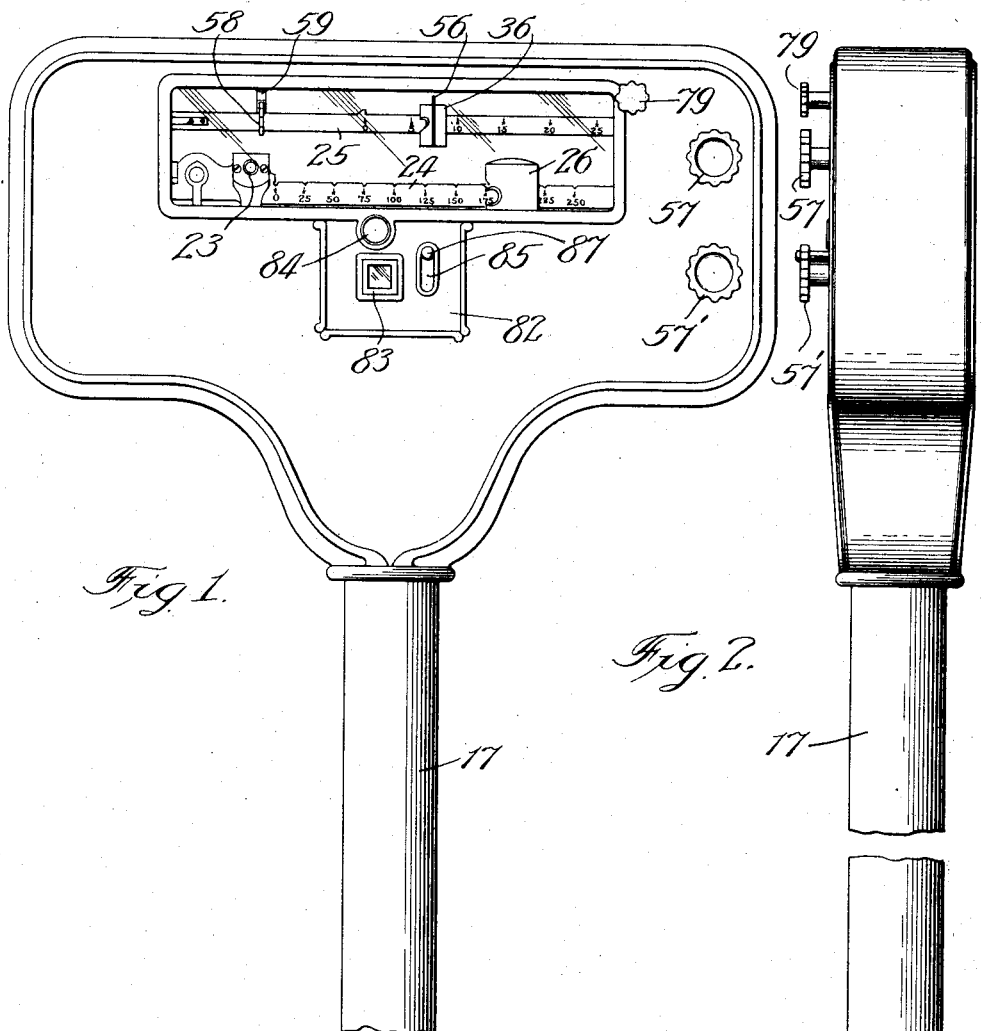
Fig. 1.
Fig. 2.
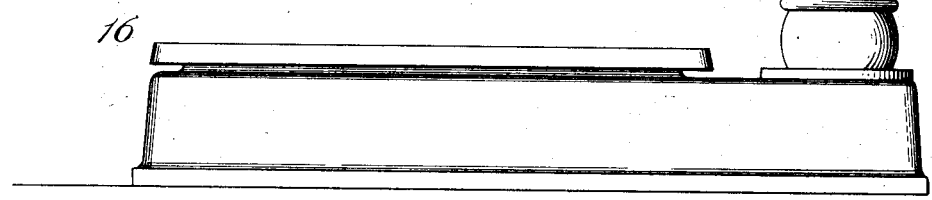
Witnesses:
Inventor:
Herbert S. Mills,
By Dyrenforth, Lee, Chritton & Wiles
Attys.

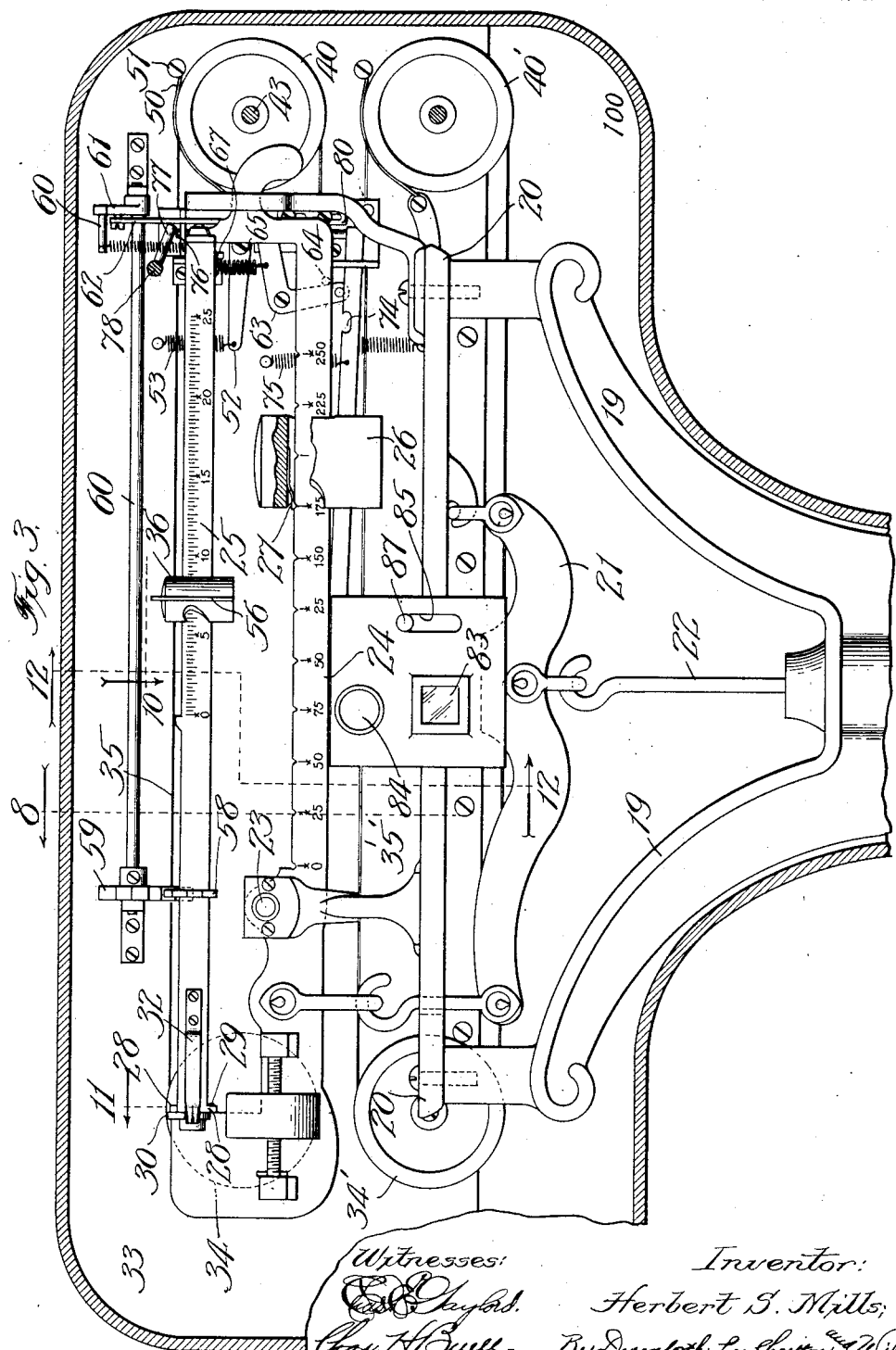

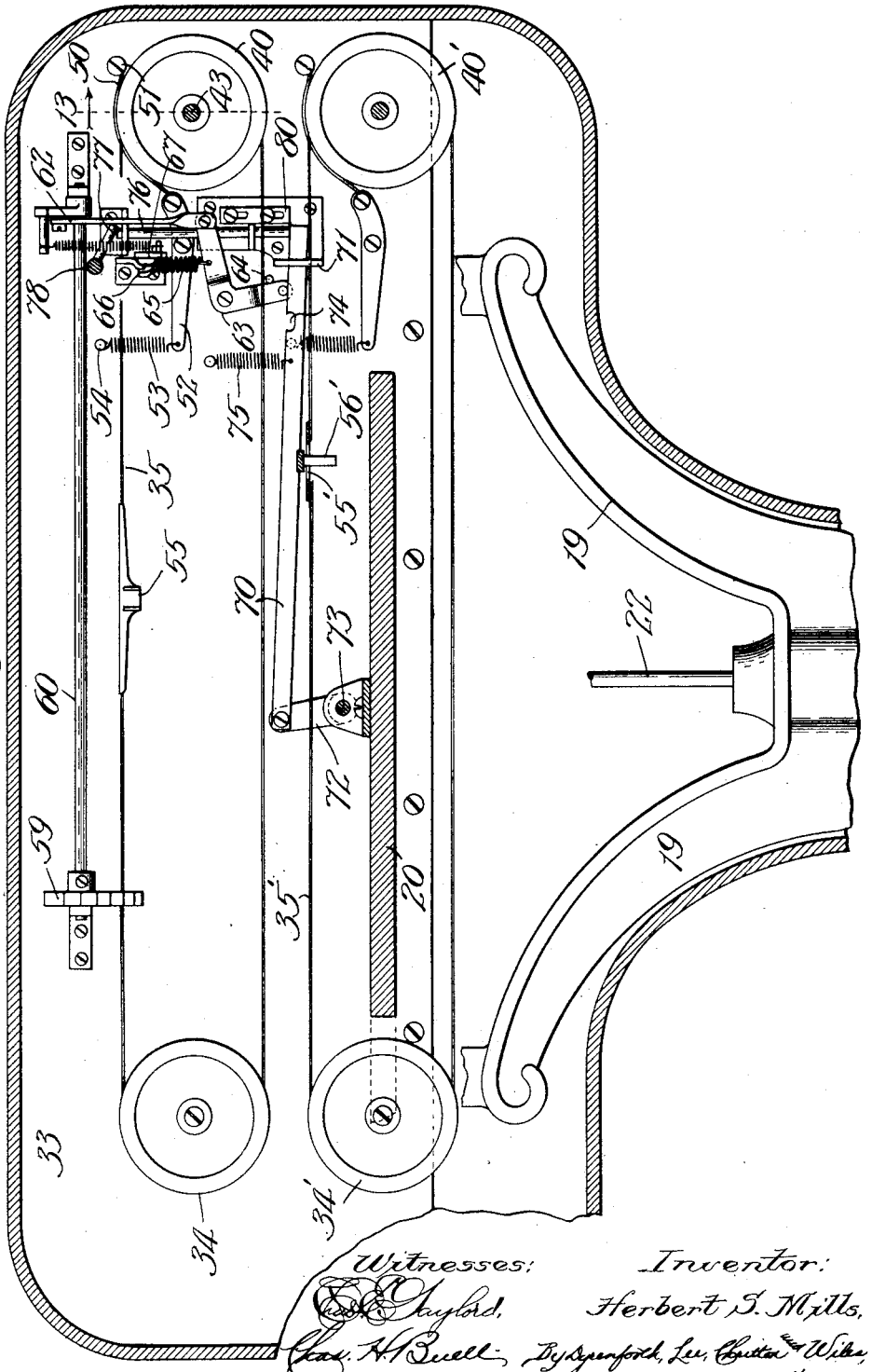

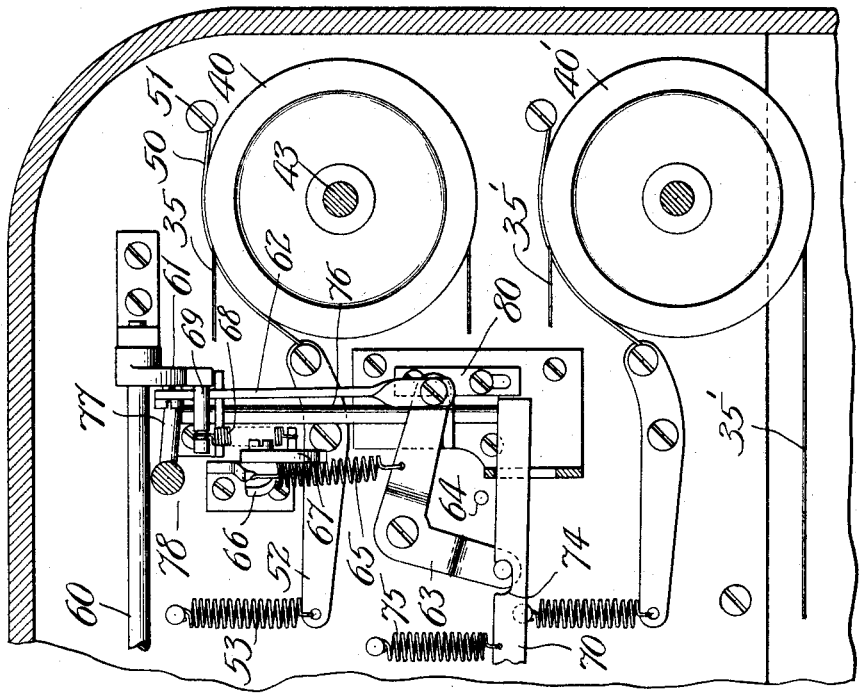

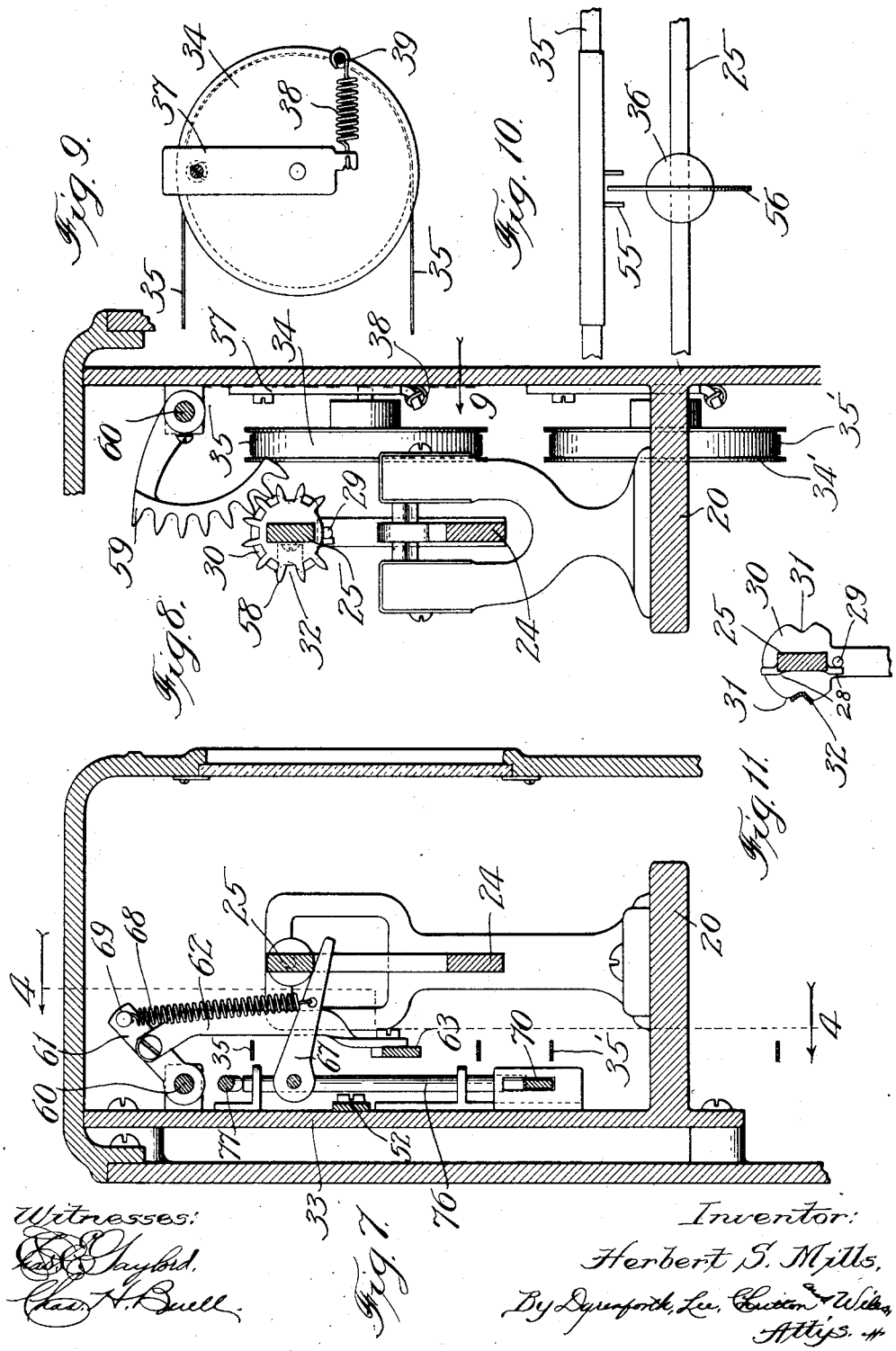
H. S. MILLS.
COIN OPERATED WEIGHING SCALE.
APPLICATION FILED JULY 21, 1913.
1,171,866. Patented Feb. 15, 1916.
6 SHEETS—SHEET 5.

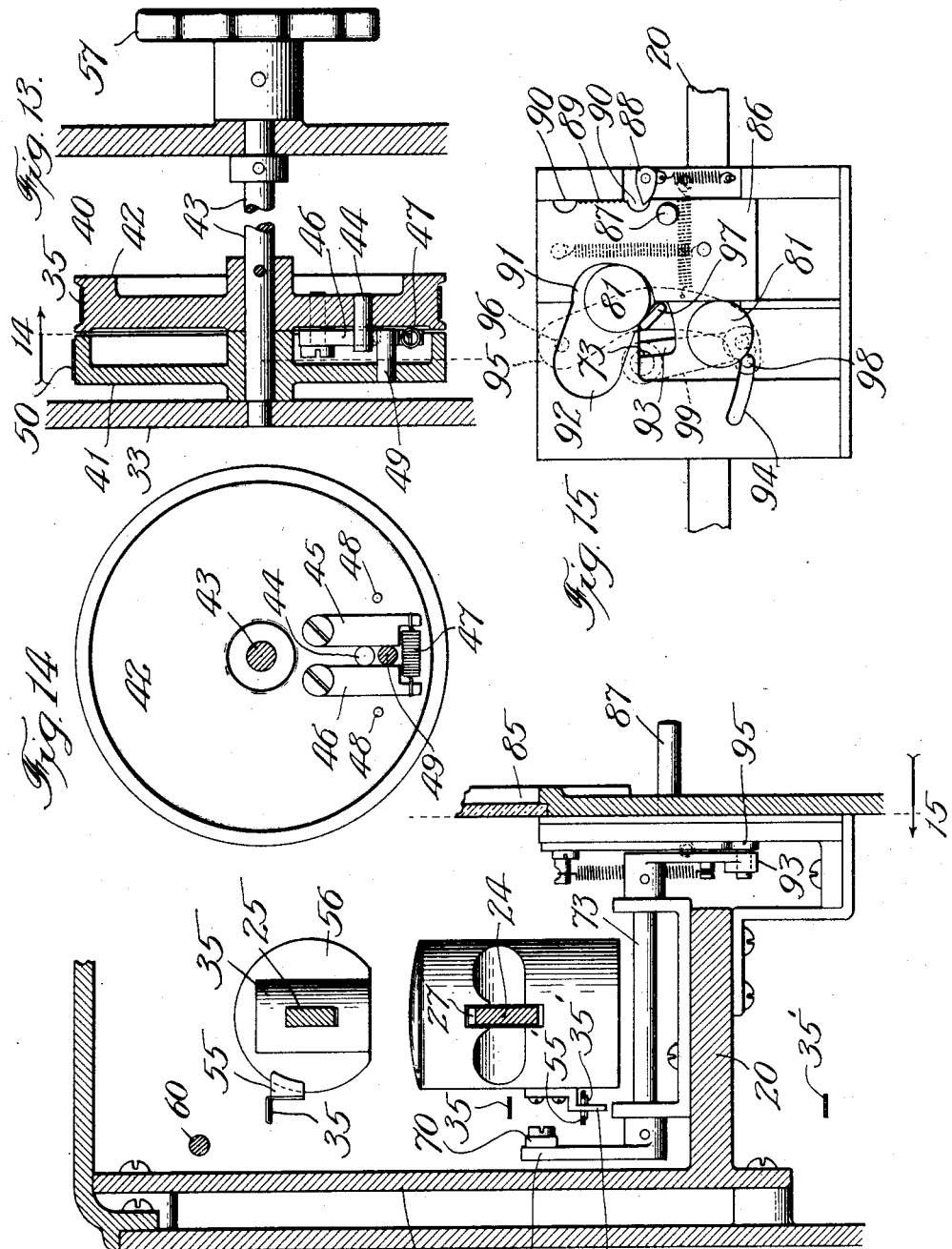

UNITED STATES PATENT OFFICE.

HERBERT S. MILLS, OF CHICAGO, ILLINOIS.

COIN-OPERATED WEIGHING-SCALE.

1,171,866.             Specification of Letters Patent.     Patented Feb. 15, 1916.

Application filed July 21, 1913. Serial No. 780,187.

*To all whom it may concern:*

Be it known that I, HERBERT S. MILLS, a citizen of the United States, residing at 221 South Green street, Chicago, in the county of Cook and State of Illinois, have invented a new and useful Improvement in Coin-Operated Weighing-Scales, of which the following is a specification.

My invention relates to an improvement in the class of coin-operated weighing scales exemplified in United States Letters Patent No. 900,409, granted to me Oct. 6, 1908.

According to the present embodiment of my invention, the scale-beam, or member thereof for displaying the scale in units and fractions of pounds, as from 0 to 25, has the scale of numbers provided only on one face, which is that normally presented to view. A spring-like finger in that position of the beam, bears upwardly against it under the tension of the spring to resist, to the extent of such tension, depression of the beam by moving the sliding weight thereon, and thus prevents the beam from being poised by the gravity of an object to be weighed imposed on the scale-platform, since the sliding weight must then be moved to a point on the beam, to poise the latter, at which it will overcome the added resistance of the finger-spring. With an object to be weighed bearing on the scale-platform, by inserting a coin into the machine, mechanism is adapted to be tripped to withdraw the finger out of the path of the beam, and by this operation the beam-member, which is pivotally supported at its ends, is reversed to present to view its blank surface. By then moving the sliding weight or weights to proper position the beam will be poised, and the operator then manipulates a handle to effect turning of the aforesaid beam-member to its initial position of displaying the scale of numbers showing the actual weight of the imposed object, which may be a person standing on the platform to be weighted.

In the accompanying drawings, Figure 1 shows my improved weighing-scale by a face-view, but with the platform broken away; Fig. 2 is a broken view of the scale in side elevation; Fig. 3 is an enlarged broken face view of the head of the scale with the front plate of the casing removed to display interior mechanism; Fig. 4 is a section on the irregular line 4—4, Fig. 7; Fig. 5 is an enlarged broken face-view showing, in normal position, the mechanisms in the head near the swinging end of the scale-beam, for moving the sliding weights and operating the finger and the rotatable scale-beam member to turn it, and Fig. 6 shows the same with the parts in the position they assume in being operated and before their operations are completed; Fig. 7 is a section on the irregular line 7—7, Fig. 5; Fig. 8 is a section on line 8, Fig. 3; Fig. 9 is a view regarded in the direction of the arrow on line 9, Fig. 8, showing the manner of supporting one of the two similarly-supported sheaves carrying at one end the endless bands for moving the sliding weights along the scale-beam members; Fig. 10 is a view regarded in the direction of the arrow on line 10, Fig. 3, and illustrating the manner of moving the sliding weight on the upper scale-beam member; Fig. 11 is a section on line 11, Fig. 3, showing means for accurately arresting the rotatable beam-member in vertical position at each end of its throw; Fig. 12 is an enlarged section on the irregular line 12—12, Fig. 3; Fig. 13 is an enlarged broken section on line 13, Fig. 4; Fig. 14 is a section on line 14, Fig. 13, and Fig. 15 shows the coin-operated device by a front-view with the face-plate of the casing removed to disclose parts hidden by it.

The scale shown is one of well-known general construction, involving the usual spring-platform 16, hollow standard 17 having diverging arms 19 carrying a head-bar 20, to which one end of the scale-lever 21 is fulcrumed, this lever being linked between its ends to a vertical rod 22 passing through the standard and connected with the spring-platform, and the opposite end of the lever being hung on the scale-beam behind its fulcrum-point at 23.

The scale-beam is shown to be formed of the two members 24 and 25, the lower member being provided on its display-face with spaced numbers from 0 to 250 successively increasing from left to right by 25, and the member being notched at each number thereon to retain the sliding weight 26 by a spring dog 27. The upper beam-member is provided on its display-face with numbers from 0 to 25, at intervals of 5, but its reverse face is blank. This member 25 is journaled at its ends in the heads on the opposite ends of the lower beam-member, to adapt it to be turned half-way around in each direction for reversing it to present, alternately, its blank face and its scale-display face, in either of which positions it abuts, at projecting studs 28 upon it, against a stop 29 extending into the paths of the stops from the adjacent beam-head. This head is furthermore provided on its inner edge with a boss 30 (Fig. 11) having V-shaped notches 31 in its opposite sides to receive the correspondingly-shaped end of a leaf-spring 32, fastened at its opposite end to the face of the rotatable beam-member to yieldingly hold the latter at either end of its throw. A vertical back-plate 33 extends upwardly from the rear edge of the head 20, with which it is shown to be integral, this plate carrying most of the mechanism hereinafter described.

The sliding weights are adapted to be moved along their respective beam-members through the medium of endless bands on pairs of sheaves turned by handles. The sheave 34, about which the band 35 for sliding the weight 36 on the beam-member 25 passes, is journaled on a lever 37 (Fig. 9) fulcrumed near its upper end to the back-plate near the left-hand end thereof, and the lever is yieldingly held, for tightening the band, by a coiled spring 38 connecting its lower end with a stud 39 on the face of the back-plate. The companion-sheave 40 is formed of two pulley-members 41 and 42 (Figs. 13 and 14) on a common shaft 43 to which the member 42 is pinned. The member 42 has a stud 44 projecting from its inner-face between two corresponding arms 45 and 46 pivoted at one end and yieldingly held together at their opposite ends by a coiled spring 47, their extent of spread being limited by stops 48, 48 projecting near their outer edges from the face of the sheave-member. This member is in alinement with the sheave 34 to adapt the band 35 to pass straightway about both sheaves. The member 41, which is loose on the shaft and faces the member 42, is recessed in its outer face about the hub to admit into the recess the levers 45, 46 and stud 44; and a stud 49 projects from it between these levers near their spring connected ends. A spring brake-band 50 bears against the periphery of the pulley-member 41, being fastened at its outer end to a pin 51 (Fig. 4) on the back-plate and at its inner end to the adjacent end of a lever 52 fulcrumed between its ends to the said plate and pulled upwardly by a coiled spring 53 connecting its opposite end with a pin 54 on the back-plate to hold the brake yieldingly against the pulley-member. A bifurcated projection 55 is provided on the endless band to embrace a web 56 projecting on opposite sides of the weight 35, and afford slight lost motion in attacking the latter to slide it by turning the shaft 43, at a hand-wheel 57 thereon, to move the band. In turning this shaft, in one direction or the other, to shift the weight, the rotation of the pulley-member 42 is transmitted to the companion-member 41 through the engagement of the studs 44 and 49 with the levers 45 and 46, to cause the recoil of the spring 47, after each manipulation of the handle 57, to turn the sheave 40, and release of the handle to retract the endless band 35 sufficiently to withdraw the attacking side of the bifurcated projection 55 from contact with the web 56 and center the latter between the prongs, thus to prevent accidental displacement of the weight when once set at the desired poising point, and assure accurate weighing by the machine.

The sliding weight 26 on the lower beam-member is adapted to be moved in the same way as that described of moving the weight 36. That is to say, an endless band 35' passes about a sheave 34' and a sheave 40', both like the corresponding parts already described, with the same braking-mechanism applied to the inner member of the sheave 40', and a hand-wheel 57' on its shaft; but in this case an opening 55' (Figs. 4 and 12) is formed through the band, and a depending finger 56' on the weight enters this opening to be attacked by the moving band for starting the weight in the same way and for the same purpose as the bifurcated projection 55 engages the sliding weight 35.

On the rotatable beam-member 25, near the fulcrumed end of the beam, is a ratchet 58 meshing with a segmental rack 59 (Fig. 8) on a rock-shaft 60, journaled at its opposite ends in bearings on the back-plate 33. A crank 61 on the end of the rock-shaft adjacent to the sheave 40 has a link-connection 62 with one arm of a bell-crank 63, fulcrumed at its angle on the back-plate and yieldingly held, with its lower arm bearing against a stop 64 to limit the extent of its swing in one direction, by a spring 65 connecting its other arm with a suitable hook at 66 projecting from the back-plate. Adjacent to this hook is pivoted a finger 67 (Fig. 7) connected by a spring 68 with a pin 69, extending laterally from the crank 61 on the rock-shaft. This finger, under the tension of the spring 68, extends transversely across and underneath the rotatable beam-member, when in its number-displaying position, to bear upwardly against that member and cause the spring-tension to present resistance to poising the beam by sliding the weights thereon, and thus prevent the machine from properly exerting its weighing function until the finger is withdrawn as hereinafter explained.

A bar 70 (see particularly, Fig. 4) is reciprocably supported near its right-hand end in a guide-loop 71 on the back-plate and is pivotally connected at its opposite end with a crank-arm 72 on an operating rock-shaft 73 journaled in bearings on the head-bar 20 (Fig. 12) to extend at a right-angle to the reciprocating bar, which moves in a plane below the fulcrum of the bell-crank 63. In the upper edge of this bar is a recess 74 to receive a stud projecting from the adjacent end of the bell-crank when the recess is brought coincident therewith, as and for the purpose hereinafter explained; and the bar is resiliently held by a spring 75 for snapping it upwardly, when, in its forward movement, the recess is brought coincident with the bell-crank arm, to enter the stud on the latter into the recess. A vertically-movable pin 76 is reciprocably confined on the back-plate to bear at its lower end against the bar 70, in the position in which it is shown in Fig. 4; and a crank-finger 77 on the end of a rock-shaft 78, journaled at its inner end on the back-plate and carrying a hand-wheel 79 on its outer end, for manipulating it, bears against the upper end of this rod for tripping it to release the bar from the bell-crank, as and for the purpose hereinafter explained. A vertically-sliding slotted stop-bar 80 is supported on the back-plate, to extend into the path of the adjacent end of the bar 70, when raised, and prevent undue extent of its advance-movement under the momentum of the bar.

The machine is rendered operative through the medium of a coin 81 coöperating with suitable mechanism most clearly illustrated in Fig. 15. This mechanism is supported at the front side and centrally of the head-bar 20 and is inclosed in a casing 82 containing in its face-plate (which is removed in Fig. 15) a glass-covered coin-display opening 83, a coin-insertion opening 84, and a vertically-elongated slot 85 (Fig. 1). A spring-raised plunger-plate 86 works vertically in the casing through an opening in its upper end, and carries, for depressing it against the resistance of the spring, a handle 87 projecting, for access to it, through the slot 85. The plunger is held immovable from any point between the limits of its stroke, by a spring-pawl 88 engaging-teeth 89 on the adjacent edge of the plate, which contains recesses 90 at the opposite ends of the teeth to permit the pawl to enter the recesses at the ends of the throw and thus free the plate. In the opposite edge of the plunger-plate is formed a coin-receiving recess 91, and a coin-chute 92, in the path through which this recess is interposed in the normally-raised position of the plunger, is formed on the inner face of the back of the casing and contains an intermediate, laterally-extending slot 93 and a lower arc-shaped and relatively narrow slot 94. A spring-held lever 95, fulcrumed at 96 on the outer-face of the back of the casing, has a stop-lug 97 projecting from it through the slot 93 normally into the coin-path through the chute, and a stop-stud 98 projecting from its lower end through the slot 94. Thus, when a coin is inserted, it rolls down the chute and lodges in the recess 91, and depression of the plunger 81 engages the inserted coin with the lug 97 to force it out of the coin-path and permit the coin to roll to the position of the lower coin shown on Fig. 15, where it lodges against the stud 98 under display at the opening 83. When, upon insertion of another coin, the plunger is again depressed, the resultant movement of the lever 95 carries the stud 98 in its slot 94 away from the first-inserted coin, thereby releasing the latter and permitting it to drop out of the casing into a suitable receptacle (not shown); and the return-movement of the plunger to its normally-raised position, by the tension of its controlling-spring upon release of the handle 87, again causes the stud 98 to be presented in position for the lodgment upon it of the last-inserted coin for display.

The coin-operated mechanism, as thus far described, need involve no feature of novelty, and its operation is well understood by those skilled in the art. The lever 95 has pivotally connected with its lower end, however, one end of a crank-arm 99, the opposite end of which is fastened to the outer end of the operating-shaft 73. A suitable casing 100, having an opening in its face, through which to display the scale-beam and which fits about the casing 82, houses the mechanism, as shown in Figs. 1 and 2, and the shafts carrying the handles 57, 57' and 79 are journaled at their outer ends in its face, and present the handles in position to be conveniently accessible for manipulating them.

The operation is as follows, with a person standing on the scale-platform to be weighed and the parts in the relative positions in which they are represented in Fig. 1: A coin is inserted into the casing 82 and the handle 87 is thereupon depressed. Resultant turning of the lever 99 turns the operating-shaft 73 to advance the bar 70 until the recess 74 in the latter registers with the stud on the adjacent end of the bell-crank 63. The spring 75 then raises the bar on its pivot to engage the recess 74 with that stud; and in this rise of the bar, it pushes the vertical rod 76 upwardly into position to be depressed. In the continued depression of the plunger 86, the bell-crank, by its engagement with the notch 74 and being stopped by the stud 64, locks the bar 70 against further advance-movement, but that depression removes the coin from obstructing the return to normal position of the lever 95 under the recoil force of its controlling-spring. By this return-movement of the lever 95, it retracts the bar 70 and, because of the engagement thereof at its recess with the bell-crank, turns the latter on its fulcrum. Thus turning the bell-crank causes it to pull downwardly, through the medium of the link 62, on the crank 61, and thereby rock the shaft 60. The crank, on turning downwardly, carries with it and relaxes the spring 68 and permits the finger 67 to drop away from the beam-member 25 while the gear connection 58, 59 between the rock-shaft and beam-member produces the forward turning of the shaft to turn that member half-way around and present to view its blank surface. Then manipulation of the handles 57, 57', to move the sliding weights, will enable them to properly poise the scale-beam, since the finger 67 is out of the way. With the beam thus poised, however, it fails to announce the weight imposed on the platform, because the blank-side of the reversible beam-member is presented to view. Therefore the operator then turns the shaft 78, at its handle 79, to cause the crank 77 to depress the vertical rod 76 against the reciprocable bar 70 and free the bell-crank from the recess 74. On being thus freed, the recoil of the spring 65 turns the bell-crank to cause the link 62, in turning upwardly the crank 61, to raise the finger 67 against the beam-member 25, thereby tensioning the spring 68, and to turn the rock-shaft 60 in the direction to cause its gear-connection with the reversible beam-member to turn the latter half-way around to its original position, wherein it will display the number, which added to that indicated by the weight on the lower beam-member, will announce the weight imposed on the scale-platform. By thus depressing the rod 76 the parts of the mechanism are brought to their original position, and the machine is ready to be again operated in the manner described.

I realize that considerable variation is possible in the details of construction thus specifically shown and described, and I do not intend by illustrating a single, specific or preferred embodiment of my invention, to be limited thereto; my intention being, in the following claims, to claim protection upon all the novelty there may be in my invention as broadly as the state of the art will permit.

What I claim as new and desire to secure by Letters Patent is—

1. In a weighing scale, the combination of a scale-beam having an oscillatory member carrying a movable weight, a spring-held finger normally bearing against said member, mechanism for withdrawing said finger from said member and turning said member to reverse it, and means for operating said mechanism to return said finger and member to their initial positions.

2. In a weighing scale, the combination of a scale-beam having an oscillatory member carrying a movable weight, a rock-shaft geared to said member, a spring-pressed bell-crank connected with the rock-shaft, a spring-held finger normally bearing against said member and connected with the rock-shaft, an operating-shaft and a spring-raised reciprocably-supported bar connected therewith and containing a recess to register, in the advance-movement of the bar, and be snapped into engagement with the bell-crank, and by its return-movement to turn the bell-crank and thereby turn the rock-shaft to withdraw the finger from and reverse the beam-member, and means for freeing said bar from the bell-crank to return the latter by its spring, to normal position and the rock-shaft, beam-member and finger to their initial positions.

3. In a weighing scale, the combination of a scale-beam having an oscillatory member carrying a movable weight, a rock-shaft geared to said member, a spring-pressed bell-crank connected with the rock-shaft, a spring-held finger normally bearing against said member and connected with the rock-shaft, an operating shaft and a spring-raised reciprocably-supported bar connected therewith and containing a recess to register, in the advance-movement of the bar, and be snapped into engagement with the bell-crank and by its return-movement to turn the bell-crank and thereby turn the rock-shaft to withdraw the finger from and reverse the beam-member, a vertically-movable rod bearing against said bar, and means for depressing said rod against the bar for freeing therefrom the bell-crank to be returned by its spring to normal position and return the rock-shaft, beam-member and finger to their normal positions.

4. In a weighing scale, the combination of a scale-beam having an oscillatory member carrying a movable weight, a rock-shaft geared to said member and having a crank on one end, a spring-pressed bell-crank having one arm connected by a link with said crank, a pivotal finger spring-supported on said crank to bear against said member, an operating shaft and a spring-raised reciprocably-supported bar connected therewith and containing a recess to register, in the advance-movement of the bar, and be snapped into engagement with the other bell-crank arm and by its return-movement to turn the bell-crank and thereby turn the rock-shaft to withdraw the finger from and reverse the beam-member, and means for freeing said bar from the bell-crank to return the latter by its spring to normal position and the rock-shaft, beam-member and finger to their normal positions.

5. In a weighing scale, the combination of a scale-beam having an oscillatory member carrying a movable weight and provided near one end with projecting stops, and a spring-finger, a stop-stud on the stationary beam-head to be encountered by the projecting stops, and opposite notches on said head to be engaged by said finger, a spring-held finger normally bearing against said member, mechanism for withdrawing the spring-held finger from said member and turning said member to reverse it, and means for operating said member to return it and the pivotal finger to their initial positions.

6. In a weighing scale, the combination of a scale-beam having an oscillatory member carrying a movable weight provided with projections on its opposite sides, and means for moving the weight, comprising an endless band carrying a fork for engaging said projections and sheaves at opposite ends of said member, about which the band passes, one of the sheaves having two opposing pulley-members respectively fast and loose on a common shaft and a resilient lost-motion connection between them.

7. In a weighing scale, the combination of a scale beam having an oscillatory member carrying a movable weight provided with projections on its opposite sides, and means for moving the weight, comprising an endless band carrying a fork for engaging said projections and sheaves at opposite ends of said member, about which the band passes, one of the sheaves having two opposing pulley-members respectively fast and loose on a common shaft, the loose member having a recessed outer face and a pin projecting therefrom and the fast member carrying on its opposing face a pair of pivotal arms spring connected at one end and a pin extending between them, and between which the pin on the loose member projects, for the purpose set forth.

HERBERT S. MILLS.

In presence of—
J. E. MORAN,
S. C. NOUL.

Copies of this patent may be obtained for five cents each, by addressing the "Commissioner of Patents, Washington, D. C."